United States Patent [19]

Bouvart

[11] Patent Number: 4,715,312

[45] Date of Patent: Dec. 29, 1987

[54] CONVERTIBLE CRAFT

[76] Inventor: Francois Bouvart, 2, avenue de Compiègne, 60300 Senlis, France

[21] Appl. No.: 893,691

[22] Filed: Aug. 6, 1986

[30] Foreign Application Priority Data

Aug. 9, 1985 [FR] France ............................ 85 12254

[51] Int. Cl.$^4$ .............................................. B63B 7/04
[52] U.S. Cl. .................................... 114/352; 114/355; 114/361; 114/71
[58] Field of Search ............... 114/352, 353, 354, 355, 114/343, 349, 361, 364, 65 R, 71, 56, 270

[56] References Cited

U.S. PATENT DOCUMENTS

| | | |
|---|---|---|
| 2,266,661 | 12/1941 | Smith . |
| 3,376,586 | 4/1968 | Forsyth et al. ...................... 114/361 |
| 3,594,834 | 7/1971 | Steensen ............................. 114/353 |
| 3,734,047 | 5/1973 | Burton . |
| 4,425,861 | 1/1984 | Raikamo .............................. 114/71 |

FOREIGN PATENT DOCUMENTS

| | | |
|---|---|---|
| 085384 | 8/1983 | European Pat. Off. . |
| 704823 | 4/1966 | Italy ..................................... 114/355 |
| 161684 | 9/1983 | Japan ................................... 114/343 |
| 797460 | 7/1958 | United Kingdom . |
| 2056922 | 3/1981 | United Kingdom .................. 114/71 |

Primary Examiner—Joseph F. Peters, Jr.
Assistant Examiner—Paul E. Salmon
Attorney, Agent, or Firm—Rosen, Dainow & Jacobs

[57] ABSTRACT

This invention relates to a craft comprising a hull capable of floating on water, the aft part of said hull constituting the hollow space of a navigation cabin, and a forward end part which constitutes a removable stem distinct from the hull, capable of being connected to and detached from the forward part of the hull and which, in the configuration in which it is detached from the forward part of the hull, is capable of being positioned above the navigation cabin to constitute a volume, preferably a living room. The craft is provided with natural means of communication from the volume defined by the removable stem with the outside of this stem, so as, in the configuration in which the stem is connected to the forward part of the hull, to allow natural flow of the excess water contained in the stem volume, out of the stem volume. One application of the invention is the production of an inexpensive combined boat/caravan.

12 Claims, 10 Drawing Figures

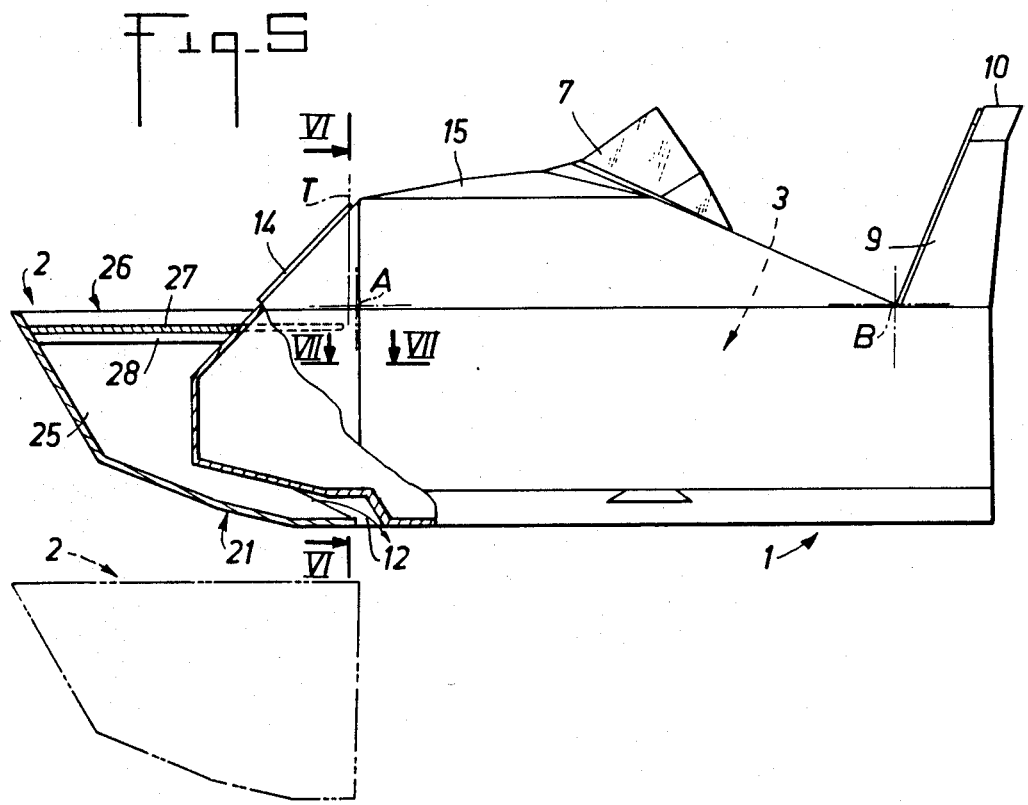
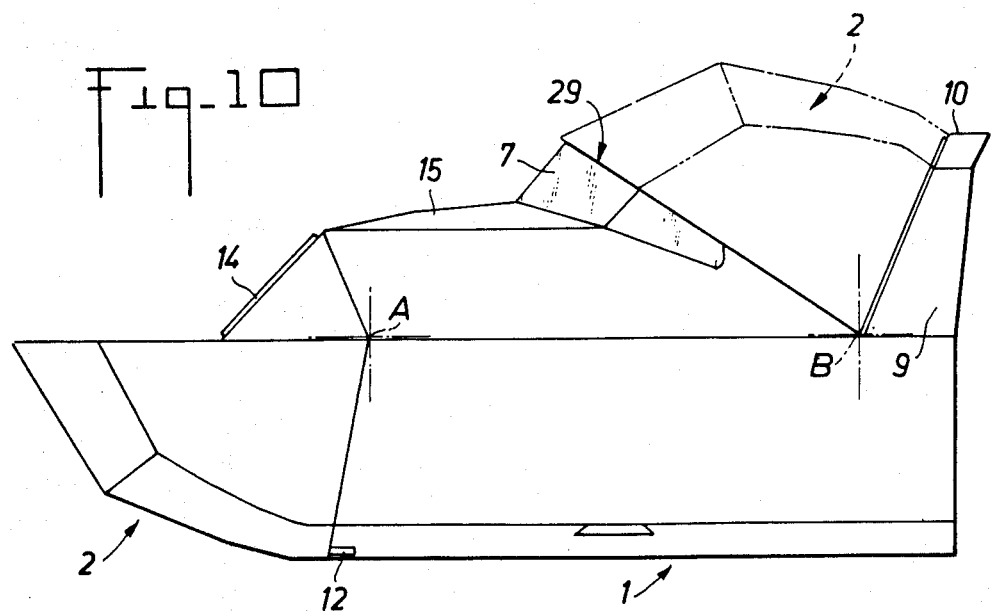

CONVERTIBLE CRAFT

BACKGROUND OF THE INVENTION

The present invention relates to a craft comprising a hull capable of floating on water, the aft part of said hull constituting the hollow space of a navigation cabin, and a forward end part which constitutes a removable stem distinct from the hull, capable of being connected to and detached from the forward part of the hull and which, in the configuration in which it is detached from said forward part of the hull, is capable of being positioned above the nagivation cabin to constitute a volume, preferably a living room.

The development of leisure and the taste for river and sea cruises and for mobile homes on land is known. However, at the present time, enthusiasts have to choose between travelling with a boat or with a mobile home, and, for a boat of small dimensions, wht the additional knowledge that it is impossible to live in it.

SUMMARY OF THE INVENTION

It is an object of the invention to overcome this drawback by making it possible to convert a boat so as to provide it with a closed volume which is larger than conventional storage chests, possibly and preferably habitable, and by providing this boat with inexpensive novel arrangements which render it economical to produce.

To this end, the craft according to the invention is provided with natural means of communication from the volume defined by the removable stem with the outside of this stem, so as, in the configuration in which the stem is connected to the forward part of the hull, to allow natural flow of the excess water contained in said volume, out of said volume.

The following advantageous arrangements are also preferably adopted:
the natural communication means comprise passages made in the lower part of the zone of joining of the removable stem with the hull;
the removable stem is rendered fast with the front of the hull by connecting means comprising, in particular, a rebate ring, possibly discontinuous, located in a plane containing a transverse horizontal axis of the hull;
either, in the configuration in which the remoable stem covers the navigation cabin, this stem is fitted to the hull and completely separates the navigation cabin from the space outside the craft,
or, the forward upper edge of the navigation cabin being constituted by a transparent visor, in the configuration in which the removable stem covers the navigation cabin, this stem is fitted to the edge of the visor and leaves said visor uncovered;
the aft end of the hull is constituted by a transom and by a frame surmounting said transom, whilst, on the one hard, a removable wall, preferably at least partially transparent, is adapted to be fitted above the transom, within the frame, and, on the other hand, the removable stem, when it covers the navigation cabin, is in abutment on said frame;
a possibly discontinuous rebate ring is located on the faces of the frame.

The principal advantage of the invention resides in the possibility of the user being able to convert the hull of his boat into a large volume, most often habitable. When the latter condition is satisfied, it is easy to convert the assembly into a caravan and thus to render the craft really polyvalent, at minimal cost.

BRIEF DESCRIPTION OF THE DRAWINGS

The invention will be more readily understood on reading the following description with reference to the accompanying drawings, in which:

FIG. 5 is a view in elevation of the craft of FIGS. 1 and 3.

FIG. 10 is a view in elevation of a second embodiment of a craft according to the invention, showing two distinct configurations of use.

DESCRIPTION OF THE PREFERRED EMBODIMENT

Figure 1:
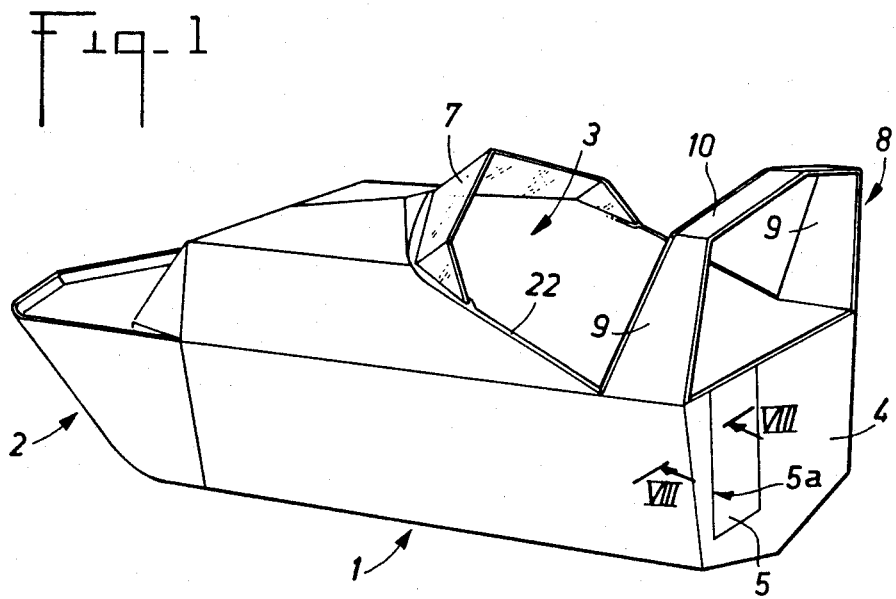
FIG. 1 is a view in perspective of the aft of a first embodiment of a craft according to the invention, in a first configuration of use.

Referring now to the drawings, the assembly comprises a boat hull 1, capable of floating, and a stem 2 which is removable with respect to hull 1.

Figure 2:
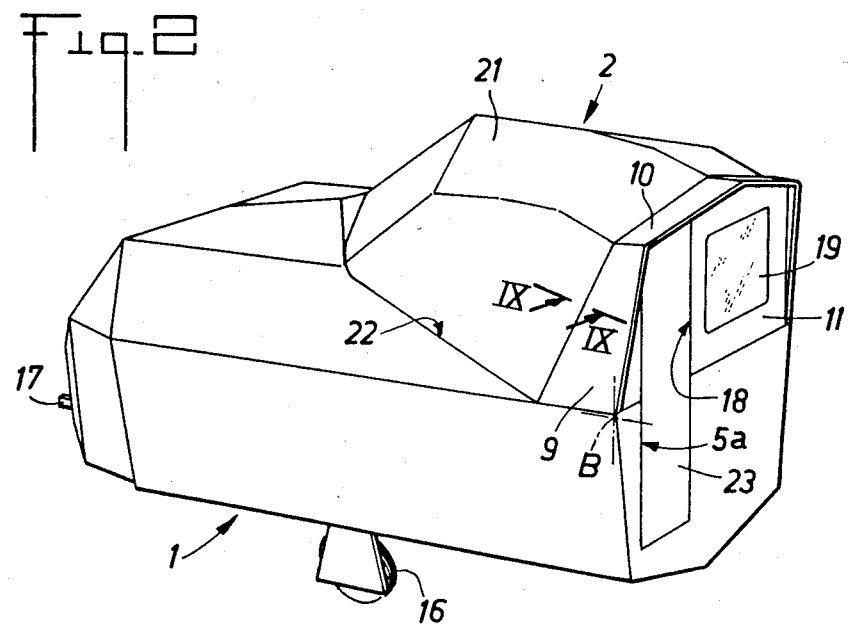
FIG. 2 is a view similar to that of FIG. 1, of the same craft, but in a second configuration of use.
Figure 4:
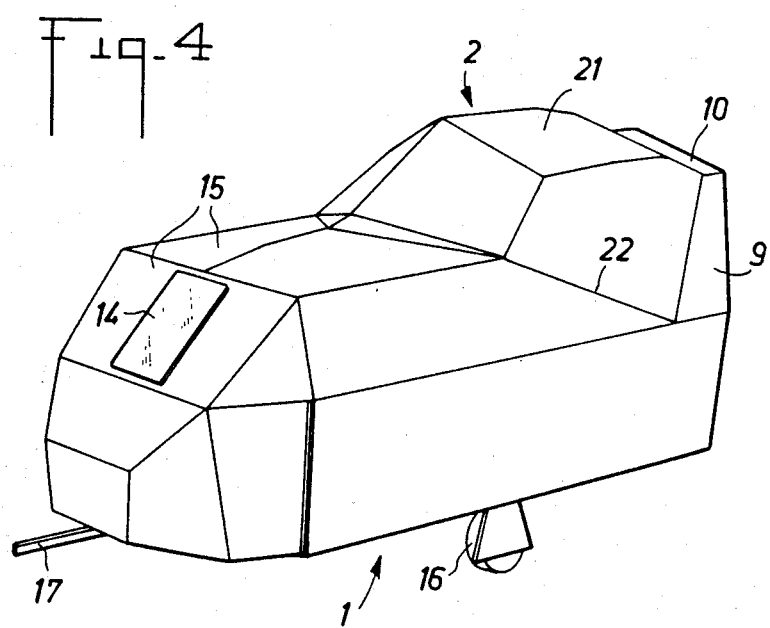
FIG. 4 is a view similar to that of FIG. 3, of the same craft, in its second configuration of use.
Figure 6:
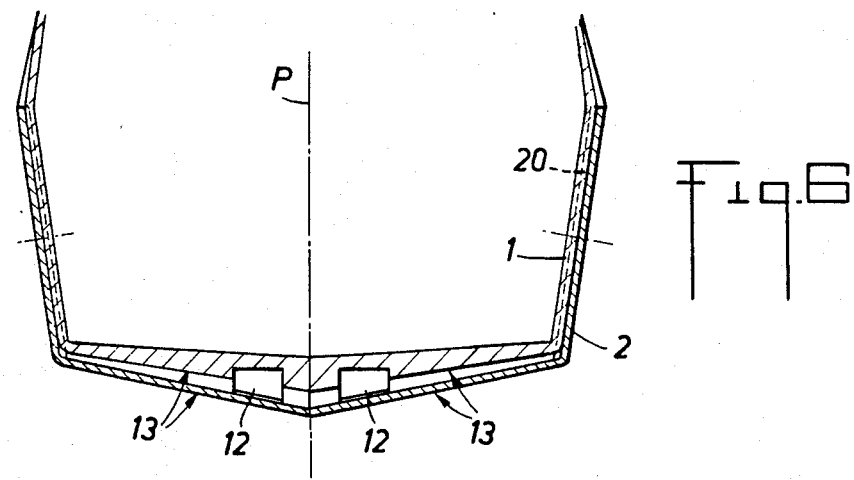
FIGS. 6 and 7 are sections along VI—VI and VII—VII, respectively, of FIG. 5.
Figure 7:
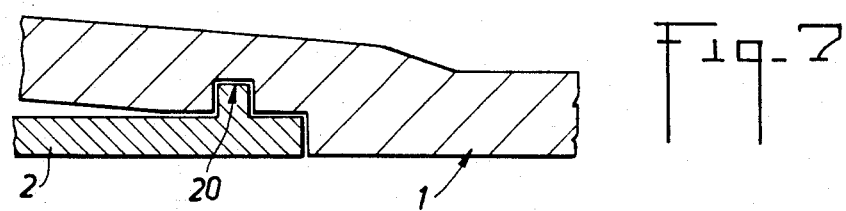
Figure 8:
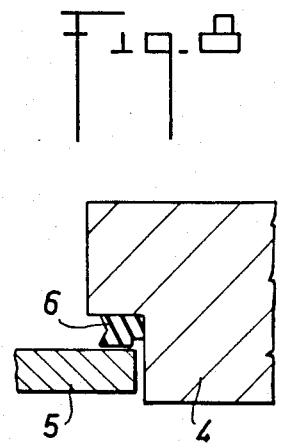
FIG. 8 is a section along VIII—VIII of FIG. 1.
Figure 9:
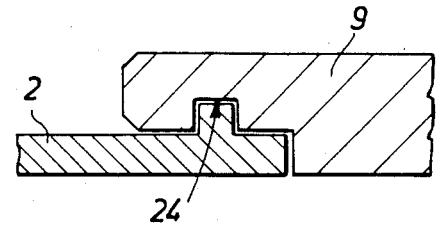
FIG. 9 is a section along IX—IX of FIG. 2.

Hull 1 is constituted by:
the hull 1 proper;
an uncovered rear space or volume 3 which constitutes the navigation cabin where the helmsman normally stands;
a rear flat transom 4 which defines, aft, the navigation cabin 3, of which the upper face is open;
the transom 4 is provided on one side with a removable panel 5 fitted on the rest of the transom 4 with the interposition of a seal 6 (FIG. 8);
at the front of the navigation cabin 3 is disposed a visor or windshield 7;
a frame 8, composed of two uprights 9 and an upper horizontal bar 10, surmounts the transom 4 and constitutes, with the upper edge of this transom, a framework inside which a removable wall 11 may be positioned (FIG. 2);
the forward lower part of hull 1 is provided, on each side of the longitudinal plane of symmetry P, with parts 12 recessed with respect to the adjacent surface 13 of this hull;
a removable hatch 14 is fixed to the forward top deck 15 of the hull, and makes it possible to enter from outside the hull to inside a volume located below said forward deck 15, preferably closed, but also accessible from inside the navigation cabin 3 via door;
wheels 16, either retractable or removable, or even possibly fixed permanently, make it possible to support and displace the hull 1 on the ground, said wheels generally being mounted on hull 1, but, in a variant, possibly belonging to a trailer for moving on the highway;
finally, a coupling 17 for haulage on the highway may be fitted to the lower forward part of the hull (FIGS. 2 and 4).

The removable wall 11 which is possibly positioned above the transom 4, within the framework defined by frame 10, comprises a recessed part 18 disposed above and in line with the opening 5a of the transom 4 on which is fitted the removable panel 5 of the transom 4, as well as a transparent window 19. A complete opening is constituted by the assembly of the recessed part 18 and the opening 5a, to which a door 23 may be fitted.

Figure 3:
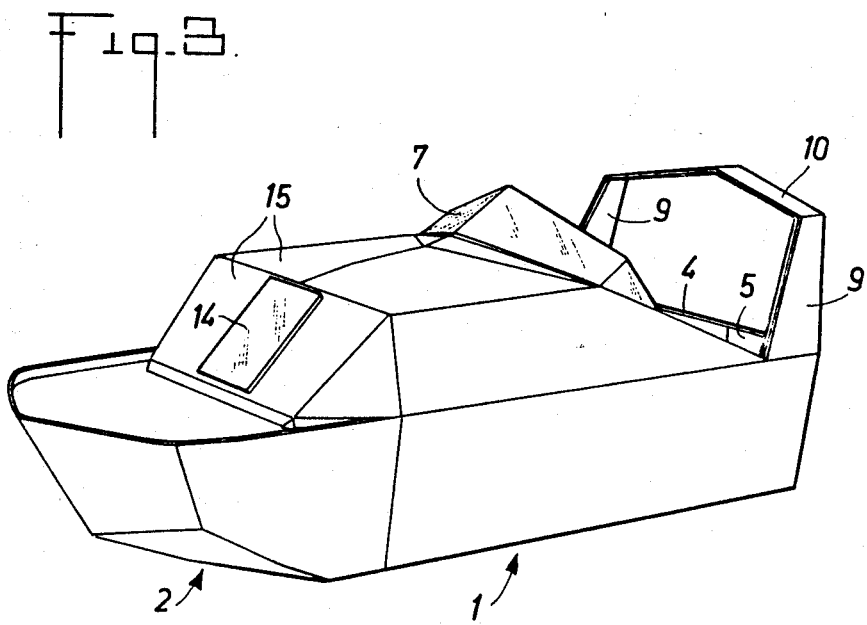
FIG. 3 is a view in perspective of the front of the craft of FIG. 1, in said first configuration of use.

The removable stem 2 is capable of occupying two distinct principal positions:

the first positions, shown in particular in FIGS. 1 and 3, in which the stem 2 is adapted to the forward part of the hull 1, by means in particular of an assembly of grooves 20 which assembly forms a rebate ring, possibly discontinuous, contained substantially in a vertical transverse plane T of the hull, or, more generally in a plane containing a horizontal transverse axis A (the plane then being inclined with respect to the vertical direction): the stem then performs its conventional function of stem;

the second position, shown in particular in FIGS. 2 and 4, in which the stem 2, detached from the forward part of the hull 1, has been upturned so that its normally lower face 21 is in this second position, oriented upwardly, and that the stem 2 then covers the space 3 of the nagivation cabin to form and enlarged volume, fitting on uprights 9 and the bar 10 of frame 8, as well as on the edge 22 bordering said navigation cabin 3. In this second position, another assembly of grooves 24 which assembly forms a rebate ring, possibly discontinuous, participates in the fixation of the stem 2 on the hull 1, also containing another horizontal transverse axis B.

The following observations should be made:

in the configuration (FIG. 5) in which the stem 2 is fixed to the foward part of the hull 1, a volume 25 is determined inside the stem 2 between the latter and the outer face of the hull, the lower part of the stem 2 joining the hull 1 in the zone where the recessed parts 12 of the hull are disposed, these recessed parts 12 communicating the volume 25 with the exterior of the boat;

the upper face 26 of the stem, in the position where the stem is fixed to the front of the hull 1, is normally open, but, on the one hand, a prop 28 may be positioned between the stem 2 and the hull 1 near face 26 is order to consolidate the assembly of these two parts, on the other hand, the face 26 may be obturated by a removable upper panel 27;

stem 2 is preferably made of a reinforced laminated plastics material, with, however, part made of an alveolar, closed-cell plastics material which gives it a positive buoyancy;

in the embodiment of FIGS. 1 to 9, in the configuration (FIGS. 2 and 4) in which the navigation cabin 3 is covered by the upturned stem, the visor or windshield 7 is also masked and hidden from outside the boat;

on the other hand, in the embodiment of FIG. 10, in the same configuration, stem 2 covers (in broken lines in FIG. 10) the navigation cabin, leaving the visor 7 uncovered and following its contour 29;

in addition to grooves 20 and 24, it is preferred to provide the craft with known rapid-fixing devices.

The possibility of converting the boat shown into a closed luggage chest for example or an enclosed habitable space resembling that of a convention caravan, without additional costs, simply by covering the navigation cabin 3 with the stem 2, after having upturned the latter, represents considerable progress.

This habitable space may, out of water, constitute a conventional caravan for use on land, but may also serve as dwelling afloat.

Of course, when the visor 7 is not masked (FIG. 10), it allows natural lighting of the enclosed space.

It should be noted that the complete rear opening 18-5a makes it easy to enter and leave the enclosed space, door 23 providing closure of this space.

The recessed parts 12 constitute passages through which the water which might possibly have penetrated in the volume 25 of the stem 2, when mounted at the front of the hull 1, particularly through its upper face 26, may be evacuated by self-emptying.

Prop 28 and removable panel 27 advantageously complete the boat and reinforce the structure thereof.

The invention is not limited to the embodiments shown, but covers, on the contrary, all variants which may be made thereto without departing from the scope nor spirit thereof.

What is claimed is:

1. A craft having an aft part and a foward end part comprising:
    a hull including said aft part and having a forward part, said hull being capable of floating on water, said aft part including a first hollow space suitable as a navigation cabin;
    a stem, said stem being said forward end part of said craft when said stem is attached along a joint to said foward part of said hull, and being adapted for positioning above said first space to at least in part enclose said first space after complete detachment of said stem from said forward part of said hull, said stem when attached at said forward part of said hull enclosing a second hollow space between said hull and stem, and further comprising communication means between said second space and the exterior of said craft, said communication means being positioned such that water entering said hollow space naturally drains to the exterior of said craft whenever the level of water within said second hollow space exceeds the level of water surrounding said craft.

2. The craft of claim 1, wherein said communication means comprise passages made in a lower part of said joint of the removable stem with the hull.

3. The craft of claim 1 wherein the removable stem is attached with the forward part of the hull at said joint by connecting means including a rebate ring located in a plane containing a transverse horizontial axis of the hull.

4. A craft as claimed in claim 3 wherein said rebate ring is discontinuous.

5. The craft of claim 1, 2 or 3, wherein, in the configuration in which the removable stem covers the first space, said stem is fitted to the hull and completely separates the first space from outside the craft.

6. The craft as claimed in claim 5 wherein the aft end of the hull includes a transom, a frame surmounting said transom and a removable wall adapted to be fitted above the transom within a framework constituted by the frame, the removable stem, when covering said first space, being in abutment on said frame.

7. The craft of any one of claim 1, 2 or 3, wherein a forward upper edge of the first space includes a transparent visor, in the configuration in which the removable stem covers the first space said stem is fitted to an edge of the visor leaving said visor uncovered.

8. The craft as claimed in claim 7, wherein the aft end of the hull includes a transom, a frame surmounting said transom and a removable wall adapted to be fitted above the transom within a framework constituted by the frame, the removable stem, when covering the first space, being in abutment on said frame.

9. The craft of claim 1, 2 or 3 wherein the aft end of the hull includes a transom, a frame surmounting said transom, and a removable wall, adapted to be fitted above the transom within a framework constituted by the frame, the removable stem, when covering said first space, being in abutment on said frame.

10. The craft of claim 9, wherein a rebate ring is located on faces of the frame for joining with said stem.

11. A craft as claimed in claim 10, wherein said frame rebate ring is discontinuous.

12. A craft as claimed in claim 1, wherein said hull extends higher than said stem when said stem is attached at said forward part of said hull.

* * * * *